United States Patent
Matsumura et al.

(10) Patent No.: US 12,289,721 B2
(45) Date of Patent: Apr. 29, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 363 days.

(21) Appl. No.: 17/802,808

(22) PCT Filed: Feb. 28, 2020

(86) PCT No.: PCT/JP2020/008351
§ 371 (c)(1),
(2) Date: Aug. 26, 2022

(87) PCT Pub. No.: WO2021/171566
PCT Pub. Date: Sep. 2, 2021

(65) Prior Publication Data
US 2023/0086798 A1 Mar. 23, 2023

(51) Int. Cl.
*H04W 72/1268* (2023.01)
*H04W 72/044* (2023.01)

(52) U.S. Cl.
CPC ..... *H04W 72/1268* (2013.01); *H04W 72/046* (2013.01)

(58) Field of Classification Search
CPC ............ H04W 72/1268; H04W 72/046; H04B 7/0617; H04L 5/0023; H04L 5/0044;
(Continued)

(56) References Cited

U.S. PATENT DOCUMENTS

2019/0349964 A1* 11/2019 Liou .................... H04B 7/0626
2020/0328849 A1* 10/2020 Noh ...................... H04L 1/1812
(Continued)

FOREIGN PATENT DOCUMENTS

| EP | 3809602 A1 | 4/2021 |
|---|---|---|
| WO | 2019/244207 A1 | 12/2019 |
| WO | 2020/031353 A1 | 2/2020 |

OTHER PUBLICATIONS

International Search Report issued in Application No. PCT/JP2020/008351 mailed on Sep. 24, 2020 (3 pages).
(Continued)

*Primary Examiner* — Tejis Daya
(74) *Attorney, Agent, or Firm* — Osha Bergman Watanabe & Burton LLP

(57) ABSTRACT

A terminal according to one aspect of the present disclosure includes a control section that determines spatial relation information for a physical uplink shared channel (PUSCH) for a plurality of transmission/reception points by using at least one of radio resource control (RRC) signaling, medium access control (MAC) signaling, and downlink control information (DCI), and a transmitting section that repeatedly transmits the PUSCH by using a spatial domain transmission filter based on the spatial relation information. According to one aspect of the present disclosure, PUSCH repetition transmission can be appropriately controlled.

5 Claims, 15 Drawing Sheets

(58) Field of Classification Search
CPC ... H04L 5/0048; H04L 5/0053; H04L 1/1671; H04L 1/08

See application file for complete search history.

(56) References Cited

U.S. PATENT DOCUMENTS

| | | | |
|---|---|---|---|
| 2021/0159966 A1* | 5/2021 | Xi | H04B 7/0691 |
| 2021/0345390 A1 | 11/2021 | Okamura et al. | |
| 2023/0022915 A1* | 1/2023 | Bhamri | H04B 7/0408 |
| 2023/0077264 A1* | 3/2023 | Gao | H04L 5/0053 |
| 2023/0164786 A1* | 5/2023 | Wang | H04L 5/0037 |
| | | | 370/329 |

OTHER PUBLICATIONS

Writtion Opinion issued in Application No. PCT/JP2020/008351 mailed on Sep. 24, 2020 (3 pages).

Zte, Sanechips, "Remaining details on codebook based UL transmission", 3GPP TSG RAN WAG1 Meeting 91, R1-1719527, Reno, USA, Nov. 27-Dec. 1, 2017 (5 pages).

Catt, "Considerations on multi-TRP/panel transmission", 3GPP TSG RAN WG1 #98bis, R1-1910349, Chongqing, China, Oct. 14-20, 2019 (25 pages).

Ntt Docomo, Inc., "Enhancements on multi-TRP/panel transmission", 3GPP TSG RAN WG1 #98bis, R1-1911184, Chongqing, China, Oct. 14-20, 2019 (32 pages).

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010 (149 pages).

Office Action issued in Japanese Application No. 2022-502784, dated Jun. 18, 2024 (8 pages).

Office Action issued in Chinese Application No. 202080097735.4, dated Jul. 19, 2024 (13 pages).

3GPP TSG RAN Meeting #86; RP-193132; Samsung; "Introduction of multiple LTE CRS rate matching patterns"; Sitges, Spain, Dec. 9-12, 2019 (12 pages).

Office Action issued in counterpart Japanese Application No. 2022-502784, mailed Feb. 27, 2024 (6 pages).

Extended European Search Report issued in counterpart European Patent Application No. 20922232.2, mailed on Sep. 25, 2023 (8 pages).

* cited by examiner

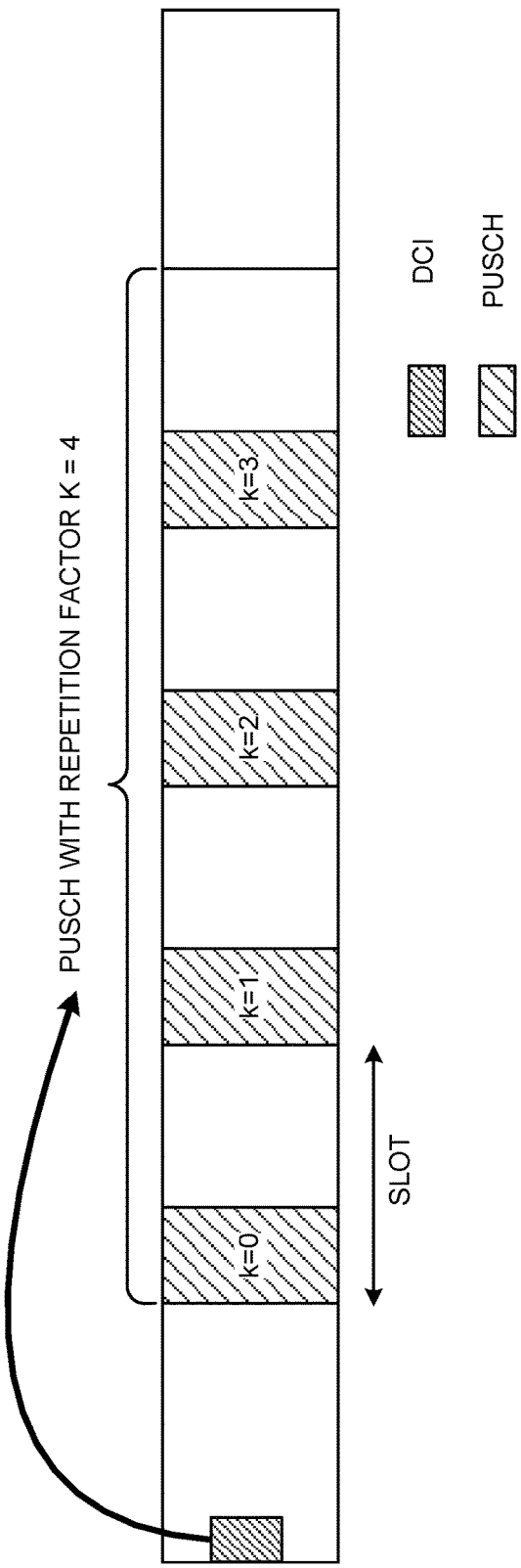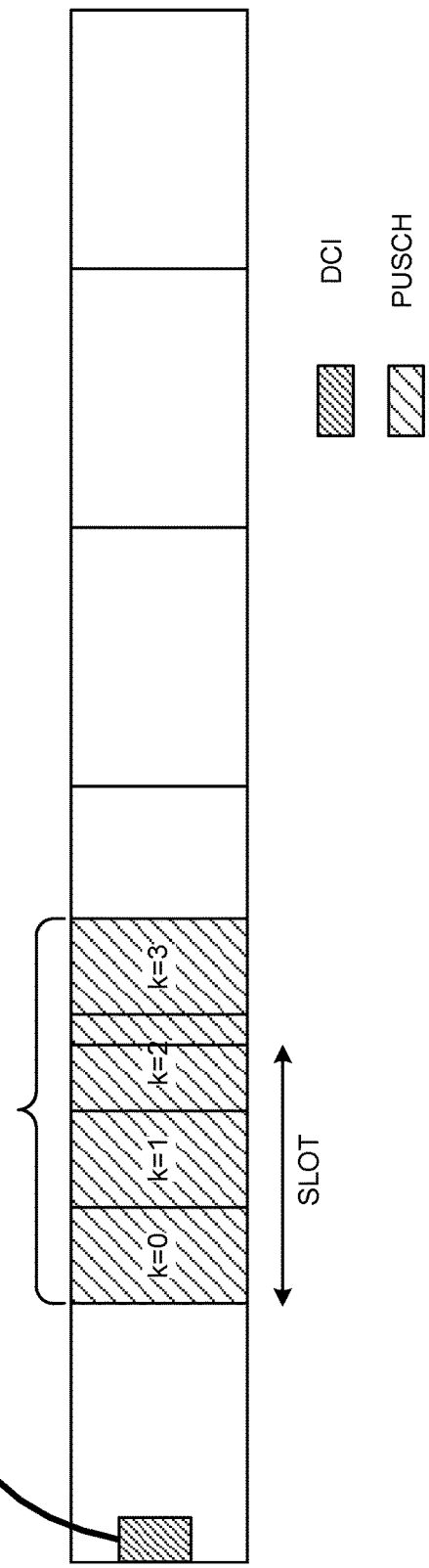

FIG. 5A

| SRS RESOURCE SET | SRS RESOURCE LIST | SRS RESOURCE |
|---|---|---|
| | SRS RESOURCE LIST #0 | {SRS RESOURCE #0} |
| | SRS RESOURCE LIST #1 | {SRS RESOURCE #0, SRS RESOURCE #1} |
| | ... | ... |

FIG. 5B

| R | ... | ... | ... | ... | Cell ID | BWP ID | | |
|---|---|---|---|---|---|---|---|---|
| | | | | | | $S_3$ | $S_2$ | $S_1$ | $S_0$ |

FIG. 5C

| Bit field mapped to index | SRS RESOURCE LIST |
|---|---|
| 0 | ACTIVATED FIRST SRS RESOURCE LIST |
| 1 | ACTIVATED SECOND SRS RESOURCE LIST |
| ... | ... |

FIG. 5D

| DCI fields | | |
|---|---|---|
| ... | Bit field for layer #1 | Bit field for layer #0 |

FIG. 6A

| SRS RESOURCE SET | SRS RESOURCE LIST | SRS RESOURCE |
|---|---|---|
| | SRS RESOURCE LIST #0 | {SRS RESOURCE #0} |
| | SRS RESOURCE LIST #1 | {SRS RESOURCE #0, SRS RESOURCE #1} |
| | ⋮ | ⋮ |

FIG. 6B

| Bit field mapped to index | SRS RESOURCE LIST |
|---|---|
| 0 | FIRST SRS RESOURCE LIST CONFIGURED BY RRC |
| 1 | SECOND SRS RESOURCE LIST CONFIGURED BY RRC |
| ⋮ | ⋮ |

FIG. 6C

| DCI fields | | |
|---|---|---|
| ⋯ | Bit field for layer #1 | Bit field for layer #0 |

FIG. 7A

| SRS RESOURCE SET | SRS RESOURCE LIST | SRS RESOURCE |
|---|---|---|
| | SRS RESOURCE LIST #0 | {SRS RESOURCE #0} |
| | SRS RESOURCE LIST #1 | {SRS RESOURCE #0, SRS RESOURCE #1} |
| | ... | ... |

FIG. 7B

| R | Cell ID | | | | | BWP ID |
|---|---|---|---|---|---|---|
| | | | | | | $S_0$ |
| | | | | | | $S_1$ |
| | | | | $S_3$ | $S_2$ | |
| ... | ... | ... | ... | | | |

FIG. 7C

| R | Cell ID | BWP ID |
|---|---|---|
| 1st Layer ID | | 1st SRS resource list ID |
| 2nd Layer ID | | 2nd SRS resource list ID |
| ... | | ... |

FIG. 8A

| SRS RESOURCE SET | SRS RESOURCE |
|---|---|
| | SRS RESOURCE #0 |
| | SRS RESOURCE #1 |
| | ... |

FIG. 8B

| Bit field mapped to index | SRI SEQUENCE |
|---|---|
| 0 | ACTIVATED FIRST SRI SEQUENCE |
| 1 | ACTIVATED SECOND SRI SEQUENCE |
| ... | |

FIG. 8C

| DCI fields | | |
|---|---|---|
| ... | Bit field for layer #1 | Bit field for layer #0 |

FIG. 9A

| SRS RESOURCE SET | SRS RESOURCE |
|---|---|
| | SRS RESOURCE #0 |
| | SRS RESOURCE #1 |
| | ... |

FIG. 9B

| | Cell ID | BWP ID | $S_0$ |
|---|---|---|---|
| | | | $S_1$ |
| | | | $S_2$ |
| | | | $S_3$ |
| | | | ... |
| | | | ... |
| | | | ... |
| | R | ... | ... |

FIG. 9C

| | Cell ID | BWP ID | | | |
|---|---|---|---|---|---|
| | | | $S_{1,0}$ | $S_{1,1}$ | $S_{1,2}$ | $S_{1,3}$ |
| | | | $S_{2,0}$ | $S_{2,1}$ | $S_{2,2}$ | $S_{2,3}$ |
| | | | ... | ... | ... | ... |
| | R | 1st Layer ID | 2nd Layer ID | ... |

FIG. 10A

| SRS RESOURCE SET | SRS RESOURCE |
| --- | --- |
| | SRS RESOURCE #0 |
| | SRS RESOURCE #1 |
| | ... |

FIG. 10B

| Bit field mapped to index | SRI SEQUENCE |
| --- | --- |
| 0 | FIRST SRI SEQUENCE |
| 1 | SECOND SRI SEQUENCE |
| ... | |

FIG. 10C

| DCI fields | | |
| --- | --- | --- |
| ... | Bit field for layer #1 | Bit field for layer #0 |

FIG. 11A

```
PUSCH-Config ::=         SEQUENCE {
[...]
Spatialrelationinfo ToAddModList    SEQUENCE (SIZE(1..maxNrofSpatialrelationinfo)) OF
                                    Spatialrelationinfo-r17  OPTIONAL,  -- Need N
Spatialrelationinfo ToReleaseList   SEQUENCE (SIZE(1..maxNrofTCI-States)) OF
                                    SpatialrelationinfoId    OPTIONAL,  -- Need N
[...]
}
```

FIG. 11B

```
PUSCH-Config ::=         SEQUENCE {
[...]
utci-StatesToAddModList    SEQUENCE (SIZE(1..maxNrofUTCI-States)) OF
                           uTCI-State               OPTIONAL,  -- Need N
utci-StatesToReleaseList   SEQUENCE (SIZE(1..maxNrofUTCI-States)) OF
                           uTCI-StateId             OPTIONAL,  -- Need N
[...]
}
```

FIG. 11C

| DCI codepoint | Spatialrelationinfo |
|---|---|
| 000 | {Spatialrelationinfo #0} |
| 001 | {Spatialrelationinfo #1} |
| 010 | {Spatialrelationinfo #0, Spatialrelationinfo #1} |
| ... | ... |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In the universal mobile telecommunications system (UMTS) network, the specifications of long term evolution (LTE) have been drafted for the purpose of further increasing high speed data rates, providing lower delays, and so on (see Non Patent Literature 1). In addition, the specifications of LTE-Advanced (third generation partnership project (3GPP) Release (Rel) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In 3GPP Rel. 15, repetition transmission is supported in a UL data channel (for example, a physical uplink shared channel (PUSCH)). The UE performs control to transmit the PUSCH over a plurality of slots (for example, K consecutive slots) based on repetition factor K configured from the network (for example, a base station). That is, when the repetition transmission is performed, each PUSCH is transmitted in a different slot (for example, in units of slots).

On the other hand, in Rel. 16 and subsequent releases, when PUSCH performs repetition transmission, it is considered to perform a plurality of PUSCH transmission within one slot. That is, each PUSCH is transmitted in units shorter than slots (for example, in units of sub slots and in units of mini slots).

Furthermore, in the NR, communication using one or a plurality of transmission/reception points (TRP) (multi-TRPs) has been studied.

However, in the previous NR specification, how the repetition transmission of the PUSCH in the multi-panel/TRP should be controlled has not been sufficiently studied. If repetition transmission of the PUSCH in the multi-TRPs is not appropriately performed, a reduction in throughput or a degradation in communication quality may be caused.

Thus, an object of the present disclosure is to provide a terminal, a radio communication method, and a base station that can appropriately control PUSCH repetition transmission.

Solution to Problem

A terminal according to one aspect of the present disclosure includes a control section that determines spatial relation information for a physical uplink shared channel (PUSCH) for a plurality of transmission/reception points by using at least one of radio resource control (RRC) signaling, medium access control (MAC) signaling, and downlink control information (DCI), and a transmitting section that repeatedly transmits the PUSCH by using a spatial domain transmission filter based on the spatial relation information.

Advantageous Effects of Invention

According to one aspect of the present disclosure, PUSCH repetition transmission can be appropriately controlled even in a case where multi-TRPs are applied.

BRIEF DESCRIPTION OF DRAWINGS

FIGS. 1A and 1B are diagrams illustrating examples of repetition transmission of PUSCH.

FIGS. 5A to 5D are diagrams illustrating examples of notification of spatial relation information according to a first embodiment.

FIGS. 6A to 6C are diagrams illustrating examples of notification of spatial relation information according to a second embodiment.

FIGS. 7A to 7C are diagrams illustrating examples of notification of spatial relation information according to a third embodiment.

FIGS. 8A to 8C are diagrams illustrating examples of notification of spatial relation information according to a fourth embodiment.

FIGS. 9A to 9C are diagrams illustrating examples of notification of spatial relation information according to a fifth embodiment.

FIGS. 10A to 10C are diagrams illustrating examples of notification of spatial relation information according to a sixth embodiment.

FIGS. 11A to 11C are diagrams illustrating examples of notification of spatial relation information according to a seventh embodiment.

DESCRIPTION OF EMBODIMENTS (Repetition Transmission)

Figure 2A:
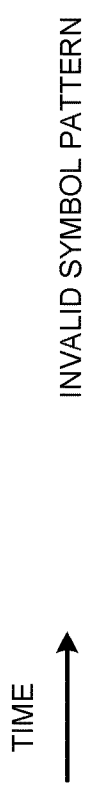
FIGS. 2A and 2B are diagrams illustrating examples of an invalid symbol pattern.

In Rel. 15, repetition transmission is supported in data transmission. For example, a base station (network (NW), gNB) repeatedly transmits DL data (for example, downlink shared channel (PDSCH)) for a given number of times.

Alternatively, a UE repeatedly transmits UL data (for example, uplink shared channel (PUSCH)) for a given number of times.

FIG. 1A is a diagram illustrating an example of repetition transmission of PUSCH. FIG. 1A illustrates an example in which a given number of PUSCH repetitions are scheduled by a single DCI. The number of repetitions is also referred to as a repetition factor K or an aggregation factor K.

In FIG. 1A, the repetition factor K=4, but the value of K is not limited to this. Further, an n-th repetition is also called an n-th transmission occasion, and the like, and may be identified by a repetition index k (0≤k≤K−1). In addition, FIG. 1A illustrates repetition transmission of a PUSCH (for example, dynamic grant-based PUSCH) dynamically scheduled by the DCI, but it may be applied to repetition transmission of a configured grant-based PUSCH.

For example, in FIG. 1A, the UE receives information indicating the repetition factor K (for example, aggregation-FactorUL or aggregationFactorDL) semi-statically by higher layer signaling. Here, the higher layer signaling may be, for example, any of radio resource control (RRC) signaling, medium access control (MAC) signaling, broadcast information, and so on, or a combination thereof.

For the MAC signaling, for example, a MAC control element (MAC CE), a MAC protocol data unit (PDU), or the like may be used. The broadcast information may be, for example, a master information block (MIB), a system information block (SIB), remaining minimum system information (RMSI), or the like.

The UE controls PDSCH reception processing (for example, at least one of reception, demapping, demodulation, and decoding) or PUSCH transmission processing (for example, at least one of transmission, mapping, modulation, and code) in K consecutive slots based on at least one of the following field valued (or information indicated by the field value) in the DCI:

the allocation of time-domain resource (such as the start symbol and the number of symbols in each slot, for example);
the allocation of frequency-domain resource (for example, a given number of resource blocks (RB) or a given number of resource block groups (RBGs));
the modulation and coding scheme (MCS) index;
the configuration of the demodulation reference signal (DMRS) of PUSCH; and
PUSCH spatial relation info, or the state of transmission configuration indication (TCI) or transmission configuration indicator (TCI-state).

The same symbol allocation may be applied between consecutive K slots. FIG. 1A illustrates a case where the PUSCH in each slot is allocated to a given number of symbols from the head of the slot. The same symbol allocation between slots may be determined as described in the above time domain resource allocation.

For example, the UE may determine the symbol allocation in each slot based on the start symbol S and the number of symbols L determined based on the value m of a given field (for example, the TDRA field) in the DCI. Note that the UE may determine the first slot based on the K2 information determined based on the value m of a given field (for example, the TDRA field) of the DCI.

On the other hand, the redundancy versions (RVs) applied to the TBs based on the same data may be the same or at least partially different between the consecutive K slots. For example, the RV applied to the TB in the n-th slot (transmission occasion, repetition) may be determined based on the value of a given field (for example, the RV field) in the DCI.

When a resource allocated in consecutive K slots is different in a communication direction in UL, DL, or flexible and at least one symbol in each slot indicated by at least one of uplink and downlink communication direction indication information for TDD control (for example, "TDD-UL-DL-ConfigCommon" and "TDD-UL-DL-ConfigDedicated" of RRC IE) and a slot format identifier of DCI (for example, DCI format 2_0), the resource of the slot including the symbol may not be transmitted (or not received).

In Rel. 15, repetition transmission of PUSCH is performed over a plurality of slots (in units of slots) as illustrated in FIG. 1A. However, in Rel. 16 and subsequent releases, it is also assumed that repetition transmission of PUSCH is performed in units shorter than slots (for example, in units of subslots, in units of mini slots, or in units of a given number of symbols) (see FIG. 1B).

In FIG. 1B, the repetition factor K=4, but the value of K is not limited to this. Further, an n-th repetition is also called an n-th transmission occasion, and the like, and may be identified by a repetition index k (0≤k≤K−1). In addition, FIG. 1B illustrates repetition transmission of a PUSCH (for example, dynamic grant-based PUSCH) dynamically scheduled by the DCI, but it may be applied to repetition transmission of a configured grant-based PUSCH.

The UE may determine the symbol allocation of PUSCH transmission (for example, PUSCH with k=0) in a given slot based on the start symbol S and the number of symbols L (for example, StartSymbol and length) determined based on the value m of a given field (for example, the TDRA field) in the DCI of the PUSCH. Note that the UE may determine the given slot based on the Ks information determined based on the value m of the given field (for example, the TDRA field) of the DCI.

The UE may dynamically receive information indicating repetition factor K (for example, numberofrepetitions) using downlink control information. The repetition factor may be determined based on the value m in the given field (for example, TDRA field) in the DCI. For example, a table in which correspondence between the bit value notified by the DCI and the repetition factor K, the start symbol S, and the number of symbols L is defined may be supported.

The slot-based repetition transmission illustrated in FIG. 1A may be referred to as a repetition transmission type A (for example, PUSCH repetition Type A), and the subslot-based repetition transmission illustrated in FIG. 1B may be referred to as a repetition transmission type B (for example, PUSCH repetition Type B).

The UE may be configured to apply at least one of a repetition transmission type A and a repetition transmission type B. For example, the repetition transmission type applied by the UE may be notified from the base station to the UE using higher layer signaling (for example, PUSCHRepTypeIndicator).

Either one of the repetition transmission type A and the repetition transmission type B may be configured in the UE for each DCI format scheduling the PUSCH.

For example, for the first DCI format (for example, DCI format 0_1), if higher layer signaling (for example, PUSCHRepTypeIndicator-AorDCIFormat0_1) is configured to the repetition transmission type B (for example, PUSCH-RepTypeB), the UE applies the repetition transmission type B for the PUSCH repetition transmission scheduled in the first DCI format. Otherwise (for example, in a case where PUSCH-RepTypeB is not configured or in a case where PUSCH-RepTypA is configure), the UE applies repetition transmission type A for the PUSCH repetition transmission scheduled in the first DCI format.

(Invalid Symbol Pattern)

In a case where the repetition transmission type B is applied to the PUSCH transmission, it is also considered to notify the UE of information regarding symbols (or symbol patterns) that cannot be used for the PUSCH transmission. The symbol pattern that cannot be used for PUSCH transmission may be referred to as an invalid symbol pattern or the like.

Notification of an invalid symbol pattern using at least one of higher layer signaling and DCI has been studied. The DCI may be in a given DCI format (for example, at least one of DCI formats 0_1 and 0_2).

For example, information regarding an invalid symbol pattern that cannot be used for PUSCH transmission is notified to the UE by using the first higher layer parameter. In addition, the UE may be notified whether to apply the information regarding the invalid symbol pattern by using the DCI. In this case, a bit field (a field for notification of whether to apply the invalid symbol pattern) for indicating whether to apply the information regarding the invalid symbol pattern may be configured in the DCI.

Further, the UE may be notified of the presence or absence of the configuration of the field for notification (or additional bits) in the DCI by using the second higher layer parameter. That is, when the information regarding the invalid symbol pattern is notified by the first higher layer parameter, the UE may determine whether to apply the information regarding the invalid symbol pattern based on the second higher layer parameter and the DCI.

If the first higher layer parameter is not notified or configured, the UE may control the transmission of the PUSCH without considering the invalid symbol pattern. When the first higher layer parameter is notified or configured, the UE may determine whether the invalid symbol pattern is applied based on the second higher layer parameter and the DCI. For example, when the second higher layer parameter indicates the DCI to add an additional bit (or, a given field) indicating whether to apply the invalid symbol pattern, the UE may determine whether to apply the invalid symbol pattern based on the given field.

Figure 2B:
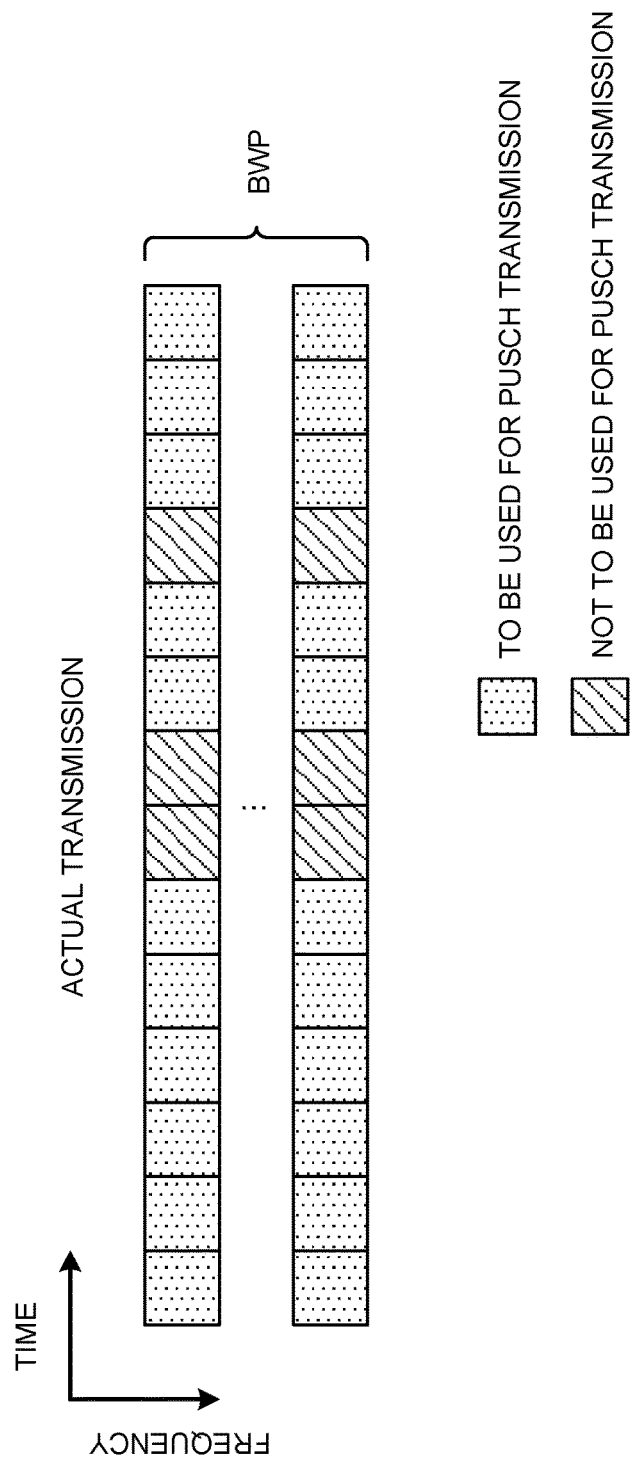

The first higher layer parameter only needs to be information notifying of a symbol pattern that becomes invalid for transmission of the PUSCH, and for example, a bitmap format may be applied (see FIG. 2A). FIG. 2A is a diagram illustrating an example of a case where an invalid symbol pattern is defined by a bitmap (1-D bitmap) for a time domain. The UE may determine resources available for PUSCH transmission in one or more frequency bandwidths (for example, the BWP) based on the information regarding the invalid symbol pattern (see FIG. 2B).

Here, a case where one or a common invalid symbol pattern is applied to a plurality of BWPs is illustrated, but different invalid symbol patterns may be configured or applied for each BWP.

(Nominal Repetitions/Actual Repetitions)

In a case where repetition transmission is performed in units of sub-slots by applying the repetition transmission type B, there is a case where a repetition transmission crosses a slot boundary depending on the repetition factor (K), the unit of data allocation, and the like.

Figure 3A:
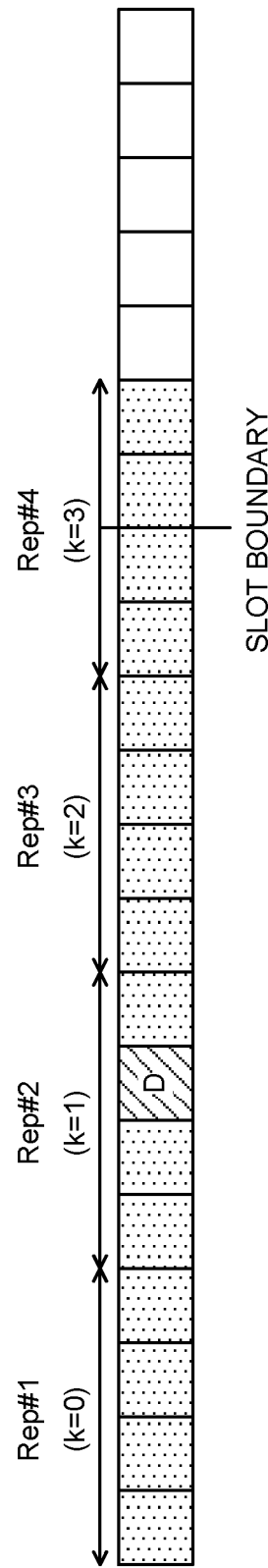
FIGS. 3A and 3B are diagrams illustrating examples of nominal repetitions and actual repetitions.

FIG. 3A illustrates an example of a case where the repetition transmission coefficient (K) is 4 and the repetition type B in a case where the PUSCH length (L) is 4 is applied. In FIG. 3A, a PUSCH with k=3 is arranged across a slot boundary. In such a case, the PUSCH may be divided (or segmented) with respect to the slot boundary and transmitted (see FIG. 3B).

In addition, a case is also assumed in which a symbol (for example, DL symbol, or invalid symbol, or the like) that cannot be used for PUSCH transmission is included in the slot. FIG. 3A illustrates a case where some symbols in which the PUSCH with k=1 is arranged include symbols that cannot be used for the PUSCH transmission (here, the DL symbol). In such a case, PUSCH transmission may be performed using symbols excluding the DL symbols (see FIG. 3B).

In a case where a DL symbol (or invalid symbol) is included in a symbol other than both ends in an allocated symbol of a PUSCH, PUSCH transmission may be performed using a symbol other than the DL symbol portion. In this case, the PUSCH may be divided (or segmented).

Figure 3B:
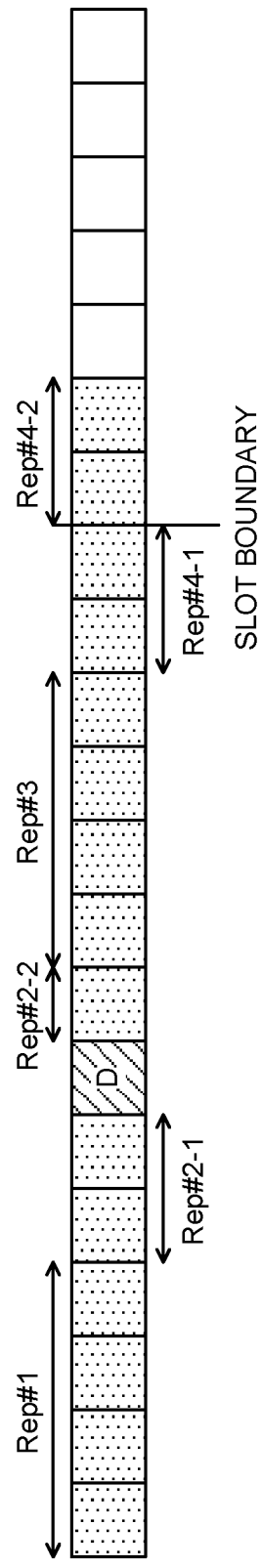

FIG. 3B illustrates a case where the PUSCH with k=1 (Rep #2) is divided into two by the DL symbol (Rep #2-1 and #2-2), and the PUSCH with k=3 (Rep #4) is divided into two by the slot boundary (Rep #4-1 and #4-2) in the subslot-based repetition transmission.

Note that the repetition transmission before considering the DL symbol, the invalid symbol, or the slot boundary (FIG. 3A) may be referred to as nominal repetitions. The repetition transmission in consideration of the DL symbol, the invalid symbol, or the slot boundary (FIG. 3B) may be referred to as actual repetitions.

(Spatial Relation for SRS and PUSCH)

In Rel. 15 NR, the UE may receive information (SRS configuration information, for example, a parameter in the RRC control element "SRS-Config") used for transmission of a measurement reference signal (for example, a sounding reference signal (SRS)).

Specifically, the UE may receive at least one of information related to one or a plurality of SRS resource sets (SRS resource set information, for example, "SRS-ResourceSet" of the RRC control element) and information related to one or a plurality of SRS resources (SRS resource information, for example, "SRS-Resource" of the RRC control element).

One SRS resource set may be associated with a given number of SRS resources (given number of SRS resources may be grouped). Each SRS resource may be specified by an SRS resource identifier (SRS Resource Indicator (SRI)) or an SRS resource ID (Identifier).

The SRS resource set information may include information of an SRS resource set ID (SRS-ResourceSetId), a list of SRS resource IDs (SRS-ResourceId) used in the resource set, an SRS resource type (for example, one of periodic SRS, semi-persistent SRS, and aperiodic CSI (Aperiodic SRS)), and SRS usage.

Herein, the SRS resource type may indicate any one of a periodic SRS (P-SRS), a semi-persistent SRS (SP-SRS), and an aperiodic CSI (A-SRS). The UE may periodically (or periodically after activation) transmit the P-SRS and the SP-SRS, and transmit the A-SRS based on the SRS request of the DCI.

Further, the usage (the RRC parameter "usage" or the Layer-1 (L1) parameter "SRS-SetUse") may be, for example, beam management, codebook (CB), noncodebook (NCB), antenna switching, or the like. SRS used for the codebook or the non-codebook may be used to determine a precoder for codebook-based or non-codebook-based PUSCH transmission based on SRI.

For example, in the case of the codebook-based transmission, the UE may determine the precoder for the PUSCH transmission on the basis of the SRI, a Transmitted Rank Indicator (TRI), and a Transmitted Precoding Matrix Indicator (TPMI). The UE may determine the precoder for the PUSCH transmission based on the SRI, for the non-codebook-based transmission.

The SRS resource information may include an SRS resource ID (SRS-ResourceId), the number of SRS ports, an SRS port number, a transmission Comb, an SRS resource mapping (for example, time and/or frequency resource location, resource offset, cycle of resource, number of repetitions, number of SRS symbols, SRS bandwidth, etc.), hopping-related information, an SRS resource type, a sequence ID, spatial relation information of an SRS, and the like.

The spatial relation information (for example, "spatialRelation Info" of the RRC information element) of the SRS may indicate spatial relation information between a given reference signal and the SRS. The given reference signal may be at least one of a Synchronization Signal/Physical Broadcast Channel (SS/PBCH) block, a Channel State Information Reference Signal (CSI-RS), or and SRS (for example, another SRS). The SS/PBCH block may be referred to as a synchronization signal block (SSB).

The spatial relation information of the SRS may include at least one of an SSB index, a CSI-RS resource ID, and an SRS resource ID as an index of the given reference signal.

Note that, in the present disclosure, an SSB index, an SSB resource ID, and an SSB resource indicator (SSBRI) may be replaced with each other. Furthermore, a CSI-RS index, a CSI-RS resource ID, and a CSI-RS resource indicator (CRI) may be replaced with each other. Further, the SRS index, the SRS resource ID, and the SRI may be replaced with each other.

The spatial relation information of the SRS may include a serving cell index, a BWP index (BWP ID), and the like corresponding to the given reference signal.

When spatial relation information regarding the SSB or CSI-RS and the SRS is configured for a given SRS resource, the UE may transmit the SRS resource by using the same spatial domain filter (spatial domain transmission filter) as a spatial domain filter (spatial domain reception filter) for receiving the SSB or CSI-RS. In this case, the UE may assume that the UE reception beam of the SSB or CSI-RS and the UE Tx beam of the SRS are the same.

For a given SRS (target SRS) resource, when spatial relation information regarding another SRS (reference SRS) and the SRS (target SRS) is configured, the UE may transmit the target SRS resource by using the same spatial domain filter (spatial domain transmission filter) as a spatial domain filter (spatial domain transmission filter) for transmitting the reference SRS. That is, in this case, the UE may assume that the UE Tx beam of the reference SRS and the UE Tx beam of the target SRS are the same.

The UE may determine the spatial relation of the PUSCH scheduled by the DCI based on a value of a given field (for example, SRS resource identifier (SRI) field) in the DCI (for example, DCI format 0_1). Specifically, the UE may use the spatial relation information (for example, "spatialRelationInfo" of the RRC information element) of the SRS resource determined based on the value (for example, SRI) of the given field for the PUSCH transmission.

When the codebook-based transmission is used for the PUSCH, in the UE, two SRS resources per SRS resource set may be configured by RRC, and one of the two SRS resources may be indicated by DCI (1-bit SRI field). When the non-codebook-based transmission is used for the PUSCH, in the UE, four SRS resources per SRS resource set may be configured by RRC, and one of the four SRS resources may be indicated by DCI (2-bit SRI field).

(Multi-TRPs)

Figure 4:
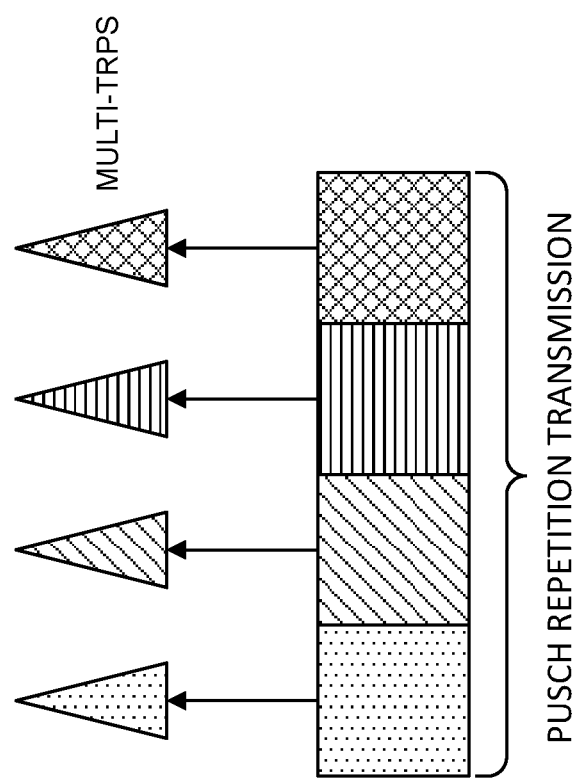
FIG. 4 is a diagram illustrating an example of repetition transmission of PUSCH in multi-TRPs.

In NR, it is considered that one or a plurality of transmission/reception points (TRPs)(multi-TRPs) performs DL transmission to UE by using one or a plurality of panels (multi-panels). It is also considered that UE performs UL transmission to one or a plurality of TRPs (see FIG. 4).

The plurality of TRPs may correspond to the same cell identifier (ID), or may correspond to different cell IDs. The cell ID may be a physical cell ID or a virtual cell ID.

However, in the previous NR specification, how the repetition transmission of the PUSCH in the multi-panel/TRP should be controlled has not been sufficiently studied. If repetition transmission of the PUSCH in the multi-TRPs is not appropriately performed, a reduction in throughput or a degradation in communication quality may be caused.

Therefore, the present inventors have conceived a control method of PUSCH repetition transmission. According to an aspect of the present disclosure, for example, a UE may perform PUSCH repetition transmission for multi-TRPs using different beams for each repetition unit (for example, segment, subslot).

Hereinafter, embodiments according to the present disclosure will be described in detail with reference to the drawings. The radio communication method according to each of the embodiments may be applied independently, or may be applied in combination with others.

Moreover, in the present disclosure, a panel, an uplink (UL) transmission entity, a TRP, spatial relation, a control resource set (CORESET), a PDSCH, a codeword, a base station, a given antenna port (e.g., demodulation reference signal (DMRS) port), a given antenna port group (e.g., DMRS port group), a given group (e.g., code division multiplexing (CDM) group, given reference signal group, and CORESET group), CORESET pool may be replaced with each other. Further, the panel identifier (ID) and the panel may be replaced with each other. The TRP ID and the TRP may be replaced with each other.

In the present disclosure, the index, the ID, the indicator, the resource ID may be replaced with each other.

In the present disclosure, "A/B" may indicate "at least one of A and B".

In the present disclosure, a list, a group, a cluster, a subset, and the like may be replaced with each other. In the present disclosure, the spatial relation information, the SRI, the SRS resource, the precoder, and the like may be replaced with each other.

In the following embodiments, the PUSCH across the plurality of TRPs may be replaced with a repetition PUSCH across the plurality of TRPs, simply a repeated PUSCH, a repetition transmission, or the like.

In addition, the SRS resource set in the following embodiments may be read as an SRS resource set whose usage is a codebook or a non-codebook, or may be read as an SRS resource set for other usages.

(Radio Communication Method)

First Embodiment

In the first embodiment, the UE is notified of the spatial relation information for the PUSCH across the plurality of TRPs by a combination of RRC signaling, MAC CE, and DCI.

FIGS. 5A to 5D are diagrams illustrating examples of notification of spatial relation information according to the first embodiment. Hereinafter, description will be given with reference to FIGS. 5A to 5D.

In the first embodiment, the UE may be configured with a given number (for example, M) of SRS resource lists in association with one SRS resource set by RRC signaling. Here, the given number M may be, for example, 8, 64, or the like, or may be larger than 64. One or a plurality of SRS resource lists may be configured in an SRS resource set for a specific use (for example, a codebook or non-codebook).

A maximum of R SRS resources may be associated with one SRS resource list. Here, R may correspond to the maximum number of TRPs for the PUSCH.

FIG. 5A illustrates an example in which a plurality of SRS resource lists (SRS resource list #0, #1, . . . ) are configured in association with the SRS resource set. The SRS resource list #0 is associated with the SRS resource #0. The SRS resource list #1 is associated with {SRS resources #0, #1}.

In the first embodiment, when a plurality of SRS resource lists are configured for the UE, one or a plurality of SRS resource lists (a subset of the SRS resource lists) are further activated by using the MAC CE. The maximum number of active SRS resource lists may be limited to a given number (for example, 2, 4, 8, etc.).

FIG. 5B is a diagram illustrating an example of an SRS resource list activation/deactivation MAC CE according to the first embodiment. FIG. 5B illustrates a bit string constituting the MAC CE. The MAC CE may include information such as a cell ID ("Serving Cell ID" field) of an application target (of the SRS resource set) and a BWP ID ("BWP ID" field of the SRS resource set). The field of "R" may mean a reserved bit for future extension. The same applies to the subsequent drawings of other MAC CEs unless otherwise noted.

Furthermore, the MAC CE includes a field of "$S_i$" (i=0, 1, 2, . . . ). When a given field of $S_i$ indicates 1, the UE activates the SRS resource list #i. When a given field of $S_i$ indicates 0, the UE deactivates the SRS resource list #i.

In the first embodiment, one or a plurality of SRS resource lists in the activated SRS resource lists may be indicated to the UE by using a field of the DCI. Note that the field may be an existing DCI field (for example, the SRI field), may be a new DCI field (for example, the SRS resource list field for repetition transmission), or may be expressed by a combination of a plurality of fields.

A UE configured with codebook-based PUSCH transmission or configured with single-layer non-codebook-based PUSCH transmission may assume that one SRS resource list is indicated for PUSCH transmission across multiple TRPs.

FIG. 5C is a diagram illustrating an example of correspondence of a DCI field for specifying one SRS resource list according to the first embodiment. In this example, a value ("Bit field mapped to index") of a given field included in the DCI and a corresponding activated SRS resource list are illustrated. The number of bits of the field may be determined based on the maximum number of active SRS resource lists.

In FIG. 5C, different SRS resource lists are specified according to the value of the field. The UE may assume that the SRS resource list #i activated by the MAC CE described above corresponds to a value of each field in ascending or descending order. That is, when the activated SRS resource list IDs and values of the fields are arranged in ascending order or descending order, it may be assumed that the activated SRS resource list IDs and values of the fields have one-to-one correspondence from the smaller one.

For example, assuming a case in which $S_1=S_0=1$ is notified in the MAC CE in FIG. 5B, an active SRS resource list corresponding to a value of each field may be specified, such as the first SRS resource list in FIG. 5C is SRS resource list #0, and the second SRS resource list is SRS resource list #1, . . . , and the like.

A UE with multiple layers of non-codebook-based PUSCH transmission configured may assume a plurality of SRS resource lists, each corresponding to spatial relation information for each layer, are indicated for PUSCH transmission across a plurality of TRPs.

FIG. 5D is a diagram illustrating an example of a DCI field for specifying a plurality of SRS resource lists according to the first embodiment. In this example, the fields of the DCI include a bit field for the layer #0, a bit field for the layer #1, and the like. The UE may determine the SRS resource list corresponding to the value of each bit field similarly to the description of FIG. 5C.

According to the first embodiment described above, it is possible to dynamically change the SRS resource list specified by the DCI by using the MAC CE to perform the PUSCH repetition transmission. For example, control using different SRS resources can be performed for each PUSCH resource and for each PUSCH repetition.

Second Embodiment

In the second embodiment, the UE is notified of the spatial relation information for the PUSCH across the plurality of TRPs by a combination of RRC signaling, and DCI.

FIGS. 6A to 6C are diagrams illustrating examples of notification of spatial relation information according to the second embodiment. Hereinafter, description will be given with reference to FIGS. 6A to 6C. What is not particularly mentioned may be the same as in the first embodiment.

In the second embodiment, the UE may be configured with a given number (for example, M) of SRS resource lists in association with one SRS resource set by RRC signaling. FIG. 6A is the same as FIG. 5A.

In the second embodiment, one or a plurality of SRS resource lists in the SRS resource lists configured by RRC may be specified to the UE by using a field of the DCI.

FIG. 6B is a diagram illustrating an example of correspondence of a DCI field for specifying one SRS resource list according to the second embodiment. In this example, a value ("Bit field mapped to index") of a given field included in the DCI and a corresponding SRS resource list configured by RRC are illustrated. The number of bits of the field may be determined based on the maximum number of configured SRS resource lists.

FIG. 6C is a diagram illustrating an example of a DCI field for specifying a plurality of SRS resource lists according to the second embodiment. This example is similar to FIG. 5D, except that each bit field corresponds to FIG. 6B.

According to the second embodiment described above, it is possible to appropriately perform the PUSCH repetition transmission on the basis of the SRS resource list specified by the DCI in the SRS resource list configured by the RRC.

Third Embodiment

In the third embodiment, the UE is notified of the spatial relation information for the PUSCH across the plurality of TRPs by a combination of RRC signaling, and MAC CE.

FIGS. 7A to 7C are diagrams illustrating examples of notification of spatial relation information according to the third embodiment. Hereinafter, description will be given with reference to FIGS. 7A to 7C. What is not particularly mentioned may be the same as in the first embodiment.

In the third embodiment, the UE may be configured with a given number (for example, M) of SRS resource lists by RRC signaling. FIG. 7A is the same as FIG. 5A.

In the third embodiment, when a plurality of SRS resource lists are configured for the UE, one or a plurality of SRS resource lists are further activated (or indicated) by using the MAC CE.

FIG. 7B is a diagram illustrating an example of an SRS resource list activation/deactivation MAC CE according to the second embodiment. FIG. 7B is the same as FIG. 5B. Note that MAC CE in FIG. 7B may be notified to a UE configured with codebook-based PUSCH transmission or configured with single-layer non-codebook-based PUSCH transmission. The UE may assume that only one field of "$S_i$" of the MAC CE indicates 1.

FIG. 7C is a diagram illustrating another example of an SRS resource list activation/deactivation MAC CE according to the second embodiment. FIG. 7C is similar to FIG. 7B, but is different in that the SRS resource list ID for each layer can be designated. For example, a first layer ID ("$1^{st}$ Layer ID") field may indicate a layer ID (for example, 0-3), and the first SRS resource list ID ("$1^{st}$ SRS resource list ID") field may be used to identify an SRS resource list corresponding to a layer of the first layer ID.

In this example, each layer ID field is indicated by 2 bits, and each SRS resource list ID field is indicated by 6 bits, but the number of bits is not limited thereto. Further, MAC CE in FIG. 7C may be notified to a UE configured with multiple layers of non-codebook-based PUSCH transmission.

In the third embodiment, the spatial relation information for the PUSCH is determined based on the SRS resource list activated by the MAC CE. For example, the UE may determine the spatial relation information based on a plurality of SRS resource lists each corresponding to the spatial relation information for each layer specified by the MAC CE in FIG. 7C. Therefore, the spatial relation information is not necessarily identified by the DCI, and in this case, the SRI field of the DCI may be reduced, or may be used for other purposes.

According to the third embodiment described above, it is possible to appropriately perform the PUSCH repetition transmission on the basis of the SRS resource list specified by the MAC CE in the SRS resource list configured by the RRC.

Fourth Embodiment

In the fourth embodiment, the UE is notified of the spatial relation information for the PUSCH across the plurality of TRPs by a combination of MAC CE, and DCI.

FIGS. 8A to 8C are diagrams illustrating examples of notification of spatial relation information according to the fourth embodiment. Hereinafter, description will be given with reference to FIGS. 8A to 8C. What is not particularly mentioned may be the same as in the first embodiment.

In the fourth embodiment, it is assumed that the UE is configured with a given number (for example, M) of SRS resources in association with one SRS resource set by RRC signaling. If M=2, it corresponds to the SRS resource set for codebook-based transmission of Rel. 15 NR, and if M=4, it corresponds to the SRS resource set for non-codebook-based transmission of Rel. 15 NR.

FIG. 8A illustrates an example in which a plurality of SRS resources (SRS resources #0, #1, . . . ) are configured in association with the SRS resource set.

In the fourth embodiment, the UE may be activated (or indicated) by the MAC CE with a given number (for example, N) of SRI sequences. Here, the SRI sequence may be a combination (set) of one to at most R SRS resources, and may be referred to as a set of SRIs, an SRI group, or the like. Here, R may correspond to the maximum number of TRPs for the PUSCH.

As the MAC CE, a MAC CE in which an SRI sequence ID is associated with a MAC CE described in the following fifth embodiment may be used.

In a fourth embodiment, one or a plurality of SRI sequences among the activated SRI sequences may be indicated to the UE by using a field of the DCI.

FIG. 8B is a diagram illustrating an example of correspondence of the DCI field for specifying one SRS resource according to the fourth embodiment. In this example, a value of a given field included in the DCI ("Bit field mapped to index") and a corresponding activated SRI sequence are illustrated. The number of bits of the field may be determined based on the maximum number of SRI sequences that can be activated.

For example, the first SRI sequence may include an SRS resource #0. The second SRI sequence may include {SRS resources #0, #1}.

FIG. 8C is a diagram illustrating an example of the DCI field for specifying a plurality of SRI sequence according to the second embodiment. This example is similar to FIG. 5D, except that each bit field corresponds to FIG. 8B.

Note that when M=1 or the number of SRI sequences to be activated is 1, the UE may assume that the DCI field for specifying the SRI sequence is 0 bit.

According to the fourth embodiment described above, the PUSCH repetition transmission can be appropriately performed based on the SRI sequence specified by the DCI among the SRI sequences activated by the MAC CE.

Fifth Embodiment

In the fifth embodiment, the UE is notified of the spatial relation information for the PUSCH across the plurality of TRPs by MAC CE.

FIGS. 9A to 9C are diagrams illustrating examples of notification of spatial relation information according to the fifth embodiment. Hereinafter, description will be given with reference to FIGS. 9A to 9C. What is not particularly mentioned may be the same as in the fourth embodiment.

In the fifth embodiment, it is assumed that the UE is configured with a given number (for example, M) of SRS resources in association with one SRS resource set by RRC signaling. FIG. 9A is the same as FIG. 8A.

In the fifth embodiment, the UE may be activated (or indicated) by the MAC CE with one or up to a given number (for example, N) of SRI sequences.

FIG. 9B is a diagram illustrating an example of an SRI sequence (or SRS resource) activation/deactivation MAC CE according to the fifth embodiment. FIG. 9B is the same as FIG. 5B except that the field of "$S_i$" indicates an SRS resource instead of an SRS resource list. The UE may assume that one or a plurality of the fields of "$S_i$" indicates 1.

For example, when the MAC CE in FIG. 9B indicating $S_1=S_0=1$ is notified, the UE may determine that the SRI sequence includes {SRS resources #0, #1}.

FIG. 9C is a diagram illustrating another example of the SRI sequence (or SRS resource) activation/deactivation MAC CE according to the fifth embodiment. FIG. 9C is similar to FIG. 7C, except that instead of the SRS resource list ID field, a field "$S_{k,i}$" indicating the activation of the SRS resource #i corresponding to the layer of the k-th layer ID field is included.

For example, if the MAC CE in FIG. 9C indicating $S_{1,1}=S_{1,0}=S_{2,2}=S_{2,1}=1$ is notified, the UE may determine that an SRI sequence corresponding to the first layer ID includes {SRS resources #0, #1}, and an SRI sequence corresponding to the second layer ID includes {SRS resources #1, #2}.

According to the fifth embodiment described above, the PUSCH repetition transmission can be appropriately performed based on the SRI sequence specified by the MAC CE.

Sixth Embodiment

In the sixth embodiment, the UE is notified of the spatial relation information for the PUSCH across the plurality of TRPs by DCI.

FIGS. 10A to 10C are diagrams illustrating examples of notification of spatial relation information according to the sixth embodiment. Hereinafter, description will be given with reference to FIGS. 10A to 10C. What is not particularly mentioned may be the same as in the fourth embodiment.

In the sixth embodiment, it is assumed that the UE is configured with a given number (for example, M) of SRS resources in association with one SRS resource set by RRC signaling. FIG. 10A is the same as FIG. 8A.

In the sixth embodiment, the UE may be indicated by the field of DCI with one or up to a given number (for example, N) of SRI sequences.

FIG. 10B is a diagram illustrating an example of correspondence of the DCI field for specifying one SRI sequence according to the sixth embodiment. In this example, a value of a given field included in the DCI ("Bit field mapped to index") and a corresponding SRI sequence are illustrated.

For example, the first SRI sequence may include an SRS resource #0. The second SRI sequence may include {SRS resources #0, #1}. Each SRI sequence may be predefined by a specification.

FIG. 10C is a diagram illustrating an example of the DCI field for specifying a plurality of SRI sequences according to the sixth embodiment. This example is similar to FIG. 5D, except that each bit field corresponds to FIG. 10B.

According to the sixth embodiment described above, the PUSCH repetition transmission can be appropriately performed based on the SRI sequence specified by the DCI.

Seventh Embodiment

In the seventh embodiment, the TCI state may be used as (or instead of) spatial relation information for the PUSCH across multiple TRPs. The TCI state may be at least one of a downlink TCI state (a DL TCI state), an uplink TCI state (a UL TCI state), and a unified TCI state. Note that the UL TCI state may be replaced with spatial relation information (spatialrelationinfo).

Here, the unified TCI state may mean a TCI state used in common to both DL and UL.

In the seventh embodiment, the UE may determine the spatial relation information for the PUSCH across the multiple TRPs according to content obtained by replacing the spatial relation information, the SRS resource, the SRI, and the like in at least one of the above-described first to sixth embodiments with the TCI state information, the TCI state, the TCI state ID, and the like, respectively.

The TCI state may be configured separately from the configuration of the SRS resource set, the configuration of the SRS resource, and the like (for example, it may be configured by PUSCH configuration information (PUSCH-Config)).

For example, the UE may be configured with a list of TCI states (for example, UL TCI state) for the PUSCH by RRC signaling.

The UE may be activated (or indicated) by the MAC CE a given number (for example, N) of TCI state sets. Here, the TCI state set may be a combination (set) of one to at most R TCI states, and may be referred to as a set of TCI states, a TCI state group, or the like. Here, R may correspond to the maximum number of TRPs for the PUSCH.

The UE may determine the TCI state set to be used in the precoder for the PUSCH based on the DCI. The TCI state set may correspond to at least one of a TCI state set configured in the RRC, a TCI state set activated in the MAC CE, a TCI state set predefined by a specification, and the like.

FIGS. 11A to 11C are diagrams illustrating examples of notification of spatial relation information according to the seventh embodiment. FIGS. 11A and 11B are the RRC information elements described using Abstract Syntax Notation One (ASN.1) notation.

As illustrated in FIG. 11A, the PUSCH configuration information (PUSCH-Config) may include a list of spatial relation information (SpatialrelationinfoToAddModList) for the PUSCH. Each Spatialrelationinfo-r17 included in the list may mean, for example, new spatial relation information in Rel. 17 or subsequent release, or may mean existing spatial relation information. The spatial relation information may be associated with a spatial relation information ID (Spatialrelationinfold).

As illustrated in FIG. 11B, the PUSCH configuration information (PUSCH-Config) may include a list of unified TCI states (utci-StatesToAddModList) for the PUSCH. Each uTCI-State included in the list may mean an individual unified TCI state. The unified TCI state may be associated with a unified TCI state ID (uTCI-StateId).

FIG. 11C is a diagram illustrating an example of correspondence of DCI fields for specifying one TCI state set (spatial relation information set) according to the seventh embodiment. The UE in which the list of the spatial relation information in FIG. 11A is configured may be indicated the T01 state set based on the field of the DCI and the correspondence in FIG. 11C.

In FIG. 11C, a code point (a value of a given field) of the DCI and a corresponding spatial relation state set are illustrated. For example, the code point=000 may correspond to the spatial relation information #0 (Spatialrelationinfo #0), the code point=001 may correspond to the spatial relation information #1 (Spatialrelationinfo #1), and the code point=010 may correspond to the spatial relation information #0 and #1 (Spatialrelationinfo #0 and #1).

According to the seventh embodiment described above, it is possible to appropriately perform the PUSCH repetition transmission based on the T01 state that can be used for the UL.

<Others>

In each of the above embodiments, the UE in which one SRS resource (or an SRS resource list including one SRS resource) is specified for the PUSCH repetition transmission may transmit the repetition transmission based on the SRS resource. Note that the repetition transmission based on the SRS resource may mean repetition transmission based on a spatial relation determined based on the SRS resource (for example, a spatial domain transmission filter based on the spatial relation is used).

In each of the above embodiments, the UE in which the plurality of SRS resources (or the SRS resource list including the plurality of SRS resources) are specified for the PUSCH repetition transmission may transmit a part of the repetition transmission based on a part of the SRS resources and transmit the remaining repetition transmission based on the remaining.

Note that the DCI (or the field of the DCI) in each of the above-described embodiments may be read as an implicit notification using the DCI. The implicit notification using the DCI may include at least one of a time resource, a frequency resource, a control channel element (CCE) index, a physical resource block (PRB) index, a resource element (RE) index, a search space index, a control resource set (CORESET) index, and an aggregation level of (detected) DCI (or corresponding to or used for receiving the DCI).

The UE may apply the same one of the foregoing first to seventh embodiments to codebook-based transmission and non-codebook-based transmission. The UE may apply the different embodiments in the foregoing first to seventh embodiments to codebook-based transmission and non-codebook-based transmission.

The UE may switch and use a plurality of embodiments among the first to seventh embodiments described above. For example, the first, third, fourth or fifth embodiment using a MAC CE may be applied when a UE receives a MAC CE configured by RRC (for example, MAC CE-based control configured to be used for PUSCH repetition transmission) or a new MAC CE (for example, the MAC CE as described in the first embodiment), otherwise a non-MAC CE based control (second or sixth embodiment) may be applied.

Further, each of the above embodiments may be applied to a case where (the operation of) multi-TRPs or multi-panels are configured in the UE, or may be applied to other cases.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 12:
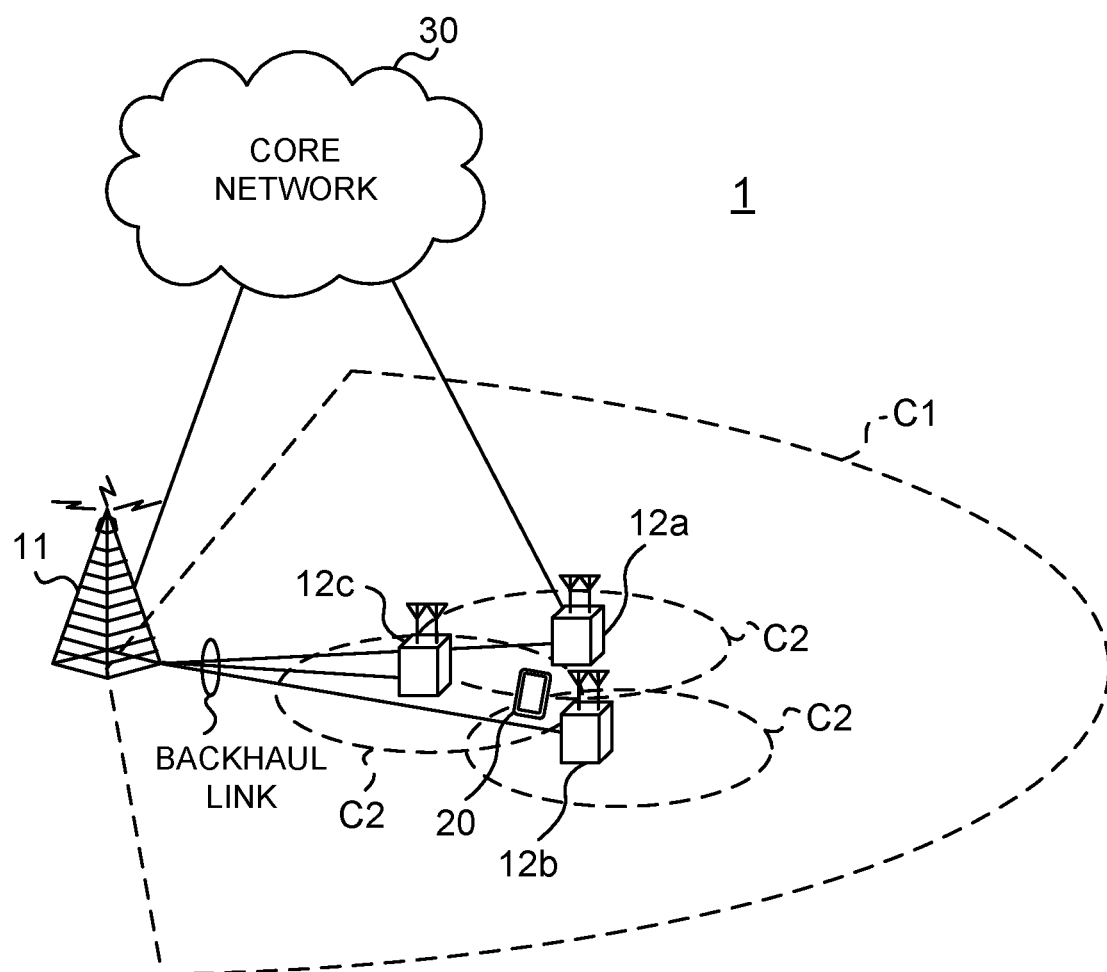
FIG. 12 is a diagram illustrating an example of a schematic configuration of a radio communication system according to one embodiment.

FIG. 12 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are arranged within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency band (frequency range 1 (FR1)) or a second frequency band (frequency range 2 (FR2)). The macro cell C1 may be included in the FR1, and the small cell C2 may be included in the FR2. For example, the FR1 may be a frequency band of 6 GHz or less (sub-6 GHz), and the FR2 may be a frequency band higher than 24 GHz (above-24 GHz). Note that the frequency bands, definitions, and the like of the FR1 and FR2 are not limited thereto, and, for example, the FR1 may correspond to a frequency band higher than the FR2.

Further, the user terminal 20 may perform communication on each CC using at least one of time division duplex (TDD) or frequency division duplex (FDD).

The plurality of base stations 10 may be connected to each other in a wired manner (for example, an optical fiber, an X2 interface, or the like in compliance with common public radio interface (CPRI)) or in a radio manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may correspond to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, a downlink shared channel (physical downlink shared channel (PDSCH))

shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by the user terminals 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. User data, higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH and the PUSCH.

Note that DCI that schedules PDSCH may be referred to as DL assignment, DL DCI, or the like, and DCI that schedules PUSCH may be referred to as UL grant, UL DCI, or the like. Note that PDSCH may be replaced with DL data, and PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. UE may monitor CORESET associated with a given search space based on search space configuration.

One search space may correspond to a PDCCH candidate corresponding to one or more aggregation levels. One or more search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a sounding reference signal (SRS), a demodulation reference signal (DMRS), or the like may be transmitted as an uplink reference signal (UL-RS). Note that, DMRSs may be referred to as "user terminal-specific reference signals (UE-specific Reference Signals)."

(Base station)

Figure 13:
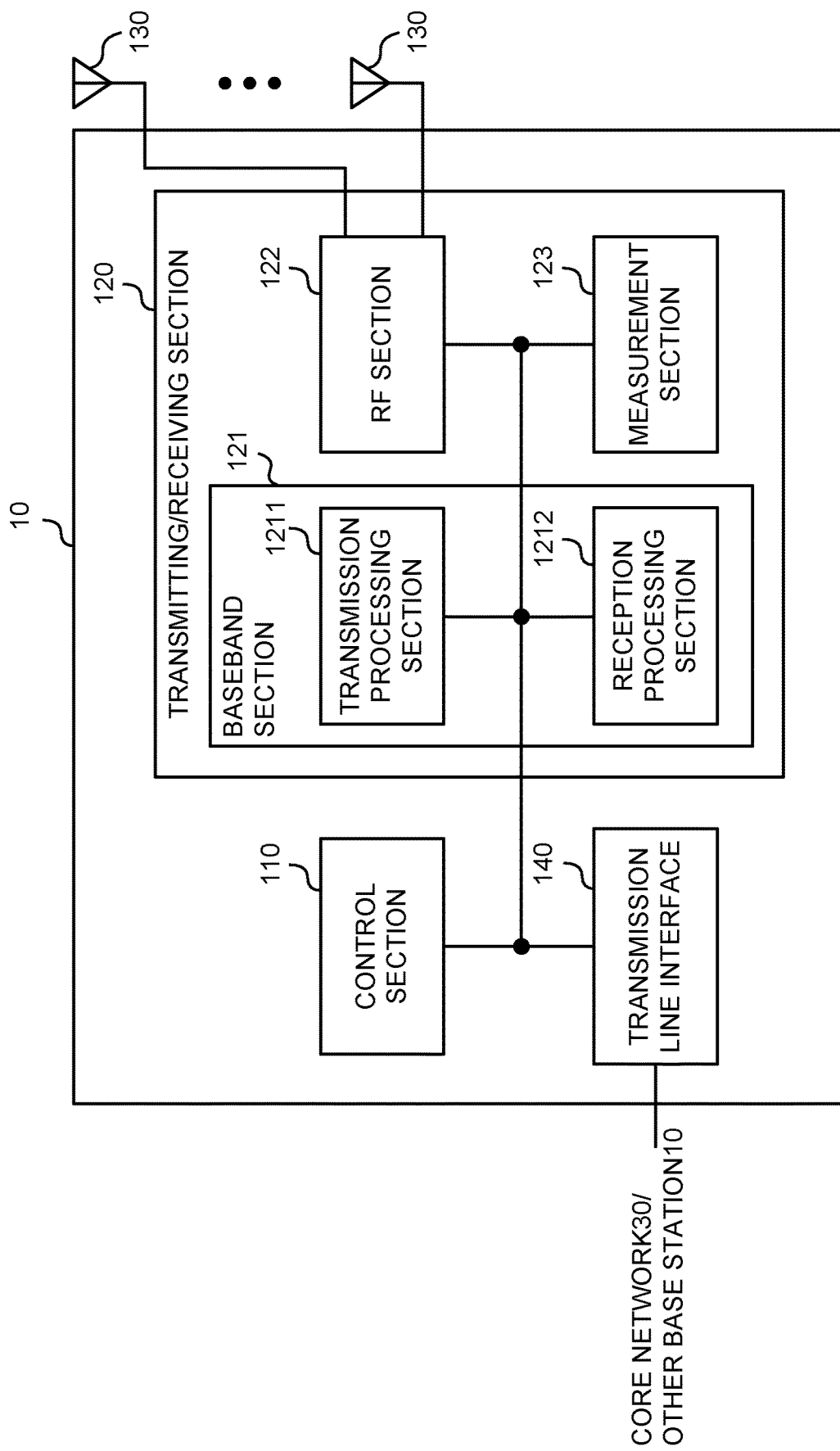
FIG. 13 is a diagram illustrating an example of a configuration of a base station according to one embodiment.

FIG. 13 is a diagram illustrating an example of a configuration of a base station according to one embodiment. The base station 10 includes a control section 110, a transmitting/receiving section 120, a transmitting/receiving antenna 130, and a transmission line interface 140. Note that one or more of the control sections 110, one or more of the transmitting/receiving sections 120, one or more of the transmitting/receiving antennas 130, and one or more of the transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmitting/receiving antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmitting/receiving circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may include the transmission processing section 1211 and the RF section 122. The receiving section may be constituted by the reception processing section 1212, the RF section 122, and the measurement section 123.

The transmitting/receiving antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam or a reception beam using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correcting encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmitting/receiving antenna 130.

Meanwhile, the transmitting/receiving section 120 (RF section 122) may perform amplification, filtering processing, demodulation to a baseband signal, and the like on the signal in the radio frequency band received by the transmitting/receiving antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that, the transmitting section and the receiving section of the base station 10 in the present disclosure may include at least one of the transmitting/receiving section 120, the transmitting/receiving antenna 130, and the transmission line interface 140.

Additionally, the transmitting/receiving section 120 may transmit, to the user terminal 20, at least one of radio resource control (RRC) signaling, medium access control (MAC) signaling, and downlink control information (DCI) used for determination of spatial relation information for physical uplink shared channel (PUSCH) for a plurality of transmission/reception points.

The transmitting/receiving section 120 may receive the PUSCH repeatedly transmitted by the user terminal 20 using a spatial domain transmission filter based on the spatial relation information.

(User Terminal)

Figure 14:
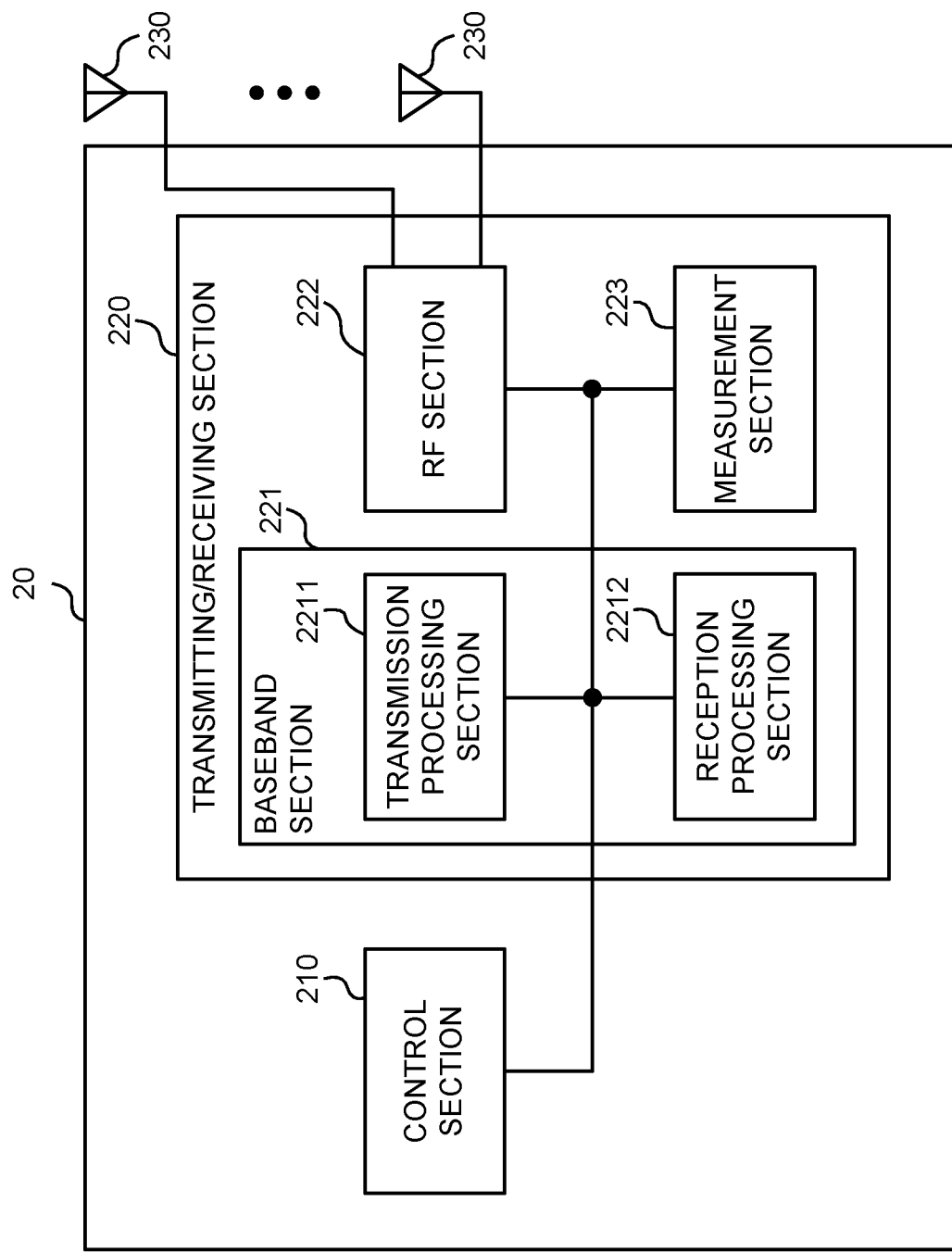
FIG. 14 is a diagram illustrating an example of a configuration of a user terminal according to one embodiment.

FIG. 14 is a diagram illustrating an example of a configuration of a user terminal according to one embodiment. The user terminal 20 includes a control section 210, a transmitting/receiving section 220, and a transmitting/receiving antenna 230. Note that one or more of the control sections 210, one or more of the transmitting/receiving sections 220, and one or more of the transmitting/receiving antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmitting/receiving circuit, and the like that are described on the basis of common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may be configured by the reception processing section 2212, the RF section 222, and the measurement section 223.

The transmitting/receiving antenna 230 can include an antenna that is described on the basis of common recognition in the technical field related to the present disclosure, for example, an array antenna or the like.

The transmitting/receiving section 220 may receive the above-described downlink channel, synchronization signal, downlink reference signal, and the like. The transmitting/ receiving section 220 may transmit the above-described uplink channel, uplink reference signal, and the like.

The transmitting/receiving section 220 may form at least one of a Tx beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a given channel (for example, PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency range, filtering processing, amplification, and the like on the baseband signal, to transmit a signal in the radio frequency range via the transmitting/receiving antenna 230.

Meanwhile, the transmitting/receiving section 220 (RF section 222) may perform amplification, filtering processing, demodulation to a baseband signal, and the like on the signal in the radio frequency range received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmitting/receiving antenna 230.

Further, the control section 210 may determine spatial relation information for a physical uplink shared channel (PUSCH) for a plurality of transmission/reception points by using at least one of radio resource control (RRC) signaling, medium access control (MAC) signaling, and downlink control information (DCI).

The transmitting/receiving section 220 may repeatedly transmit the PUSCH by using a spatial domain transmission filter based on the spatial relation information. In the present disclosure, the spatial relation information and the spatial relation may be replaced with each other.

The control section 210 may determine the spatial relation information based on a sounding reference signal (SRS) resource list related to an SRS resource set configured by the RRC signaling.

The control section 210 may determine the spatial relation information based on a plurality of the SRS resource lists each corresponding to spatial relation information for each layer. The control section 210 may determine the plurality of the SRS resource lists each corresponding to spatial relation information for each layer based on at least one of the MAC CE and the DCI.

(Hardware Configuration)

Note that the block diagrams that have been used to describe the above embodiments illustrate blocks in functional units. These functional blocks (components) may be implemented in arbitrary combinations of at least one of hardware and software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional blocks may be implemented by combining software with the above-described single apparatus or the above-described plurality of apparatuses.

Here, the function includes, but not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (component) that has a transmission function may be referred to as a transmitting section (transmitting unit), a transmitter, and the like. In any case, as described above, the implementation method is not particularly limited.

Figure 15:
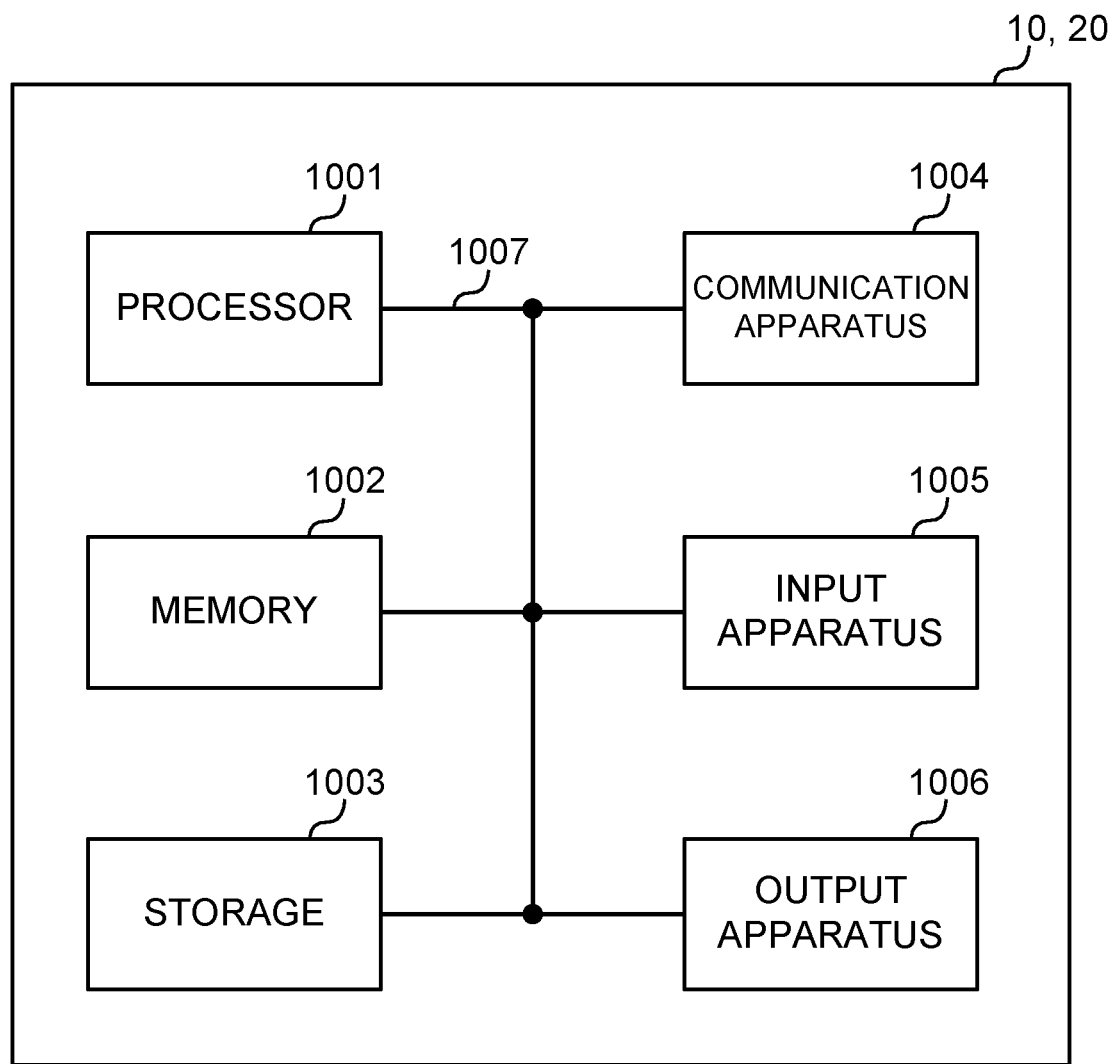
FIG. 15 is a diagram illustrating an example of a hardware configuration of a base station and a user terminal according to one embodiment.

For example, the base station, the user terminal, and the like according to one embodiment of the present disclosure may function as a computer that executes the processing of the radio communication method of the present disclosure. FIG. 15 is a diagram illustrating an example of a hardware configuration of the base station and the user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, terms such as an apparatus, a circuit, a device, a section, or a unit can be replaced with each other. The hardware configuration of the base station 10 and the user terminal 20 may be configured to include one or a plurality of apparatuses illustrated in the drawings or may be configured without including some apparatuses.

For example, although only one processor 1001 is illustrated, a plurality of processors may be provided. Further, the processing may be executed by one processor, or the processing may be executed by two or more processors simultaneously or sequentially, or using other methods. Note that the processor 1001 may be implemented by one or more chips.

Each of functions of the base station 10 and the user terminal 20 is implemented by causing given software (program) to be read on hardware such as the processor 1001 or the memory 1002, thereby causing the processor 1001 to perform operation, to control communication via the communication apparatus 1004, and to control at least one of reading and writing of data in the memory 1002 and the storage 1003.

The processor 1001 controls the whole computer by, for example, running an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and the like from at least one of the storage 1003 or the communication apparatus 1004 into the memory 1002 and executes various types of processing according to these. As the program, a program that causes a computer to execute at least a part of the operation described in the above-described embodiment is used. For example, the control section 110 (210) may be implemented by a control program that is stored in the memory 1002 and operates in the processor 1001 or may be implemented similarly by other functional blocks.

The memory 1002 is a computer-readable recording medium, and may be constituted by, for example, at least one of a read only memory (ROM), an erasable programmable ROM (EPROM), an electrically EPROM (EEPROM), a random access memory (RAM) or other desired storage media. The memory 1002 may be referred to as a register, a cache, a main memory (primary storage apparatus), and the like. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc ROM (CD-ROM) and the like), a digital versatile disc, a Blu-ray (registered trademark) disc), a removable disk, a hard disk drive, a smart card, a flash memory device (for example, a card, a stick, a key drive), a magnetic stripe, a database, a server, and other desirable storage media. The storage 1003 may be referred to as a "secondary storage device".

The communication apparatus 1004 is hardware (transmitting/receiving device) for allowing inter-computer communication by using at least one of a wired network and a wireless network and may be referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmitting/receiving antenna 130 (230), and the like described above may be implemented by the communication apparatus 1004. The transmitting/receiving section 120 (220) may be implemented by physically or logically separating a transmitting section 120*a* (220*a*) and a receiving section 120*b* (220*b*) from each other.

The input apparatus 1005 is an input device for receiving input from the outside (for example, a keyboard, a mouse, a microphone, a switch, a button, a sensor, and the like). The output apparatus 1006 is an output device that performs output to the outside (for example, a display, a speaker, a light emitting diode (LED) lamp, or the like). Note that the input apparatus 1005 and the output apparatus 1006 may be integrated (for example, a touch panel).

Furthermore, the respective devices such as the processor 1001 and the memory 1002 are connected by the bus 1007 for communicating information. The bus 1007 may be constituted by a single bus or may include different buses between devices.

Furthermore, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented by at least one of the hardware.

(Modification)

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Furthermore, a component carrier (CC) may be referred to as a cell, a frequency carrier, a carrier frequency, and the like.

A radio frame may include one or a plurality of periods (frames) in the time domain. Each of the one or more periods (frames) included in the radio frame may be referred to as a subframe. Further, the subframe may include one or more slots in the time domain. A subframe may have a fixed time duration (for example, 1 ms) that is not dependent on numerology.

Here, numerology may be a communication parameter applied to at least one of transmission and reception of a given signal or channel. Numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, and specific windowing processing performed by the transceiver in the time domain.

A slot may be constituted by one or a plurality of symbols in the time domain (orthogonal frequency division multiplexing (OFDM) symbols, single carrier frequency division multiple access (SC-FDMA) symbols, and the like). Also, a slot may be a time unit based on numerology.

A slot may include a plurality of mini slots. Each mini slot may include one or more symbols in the time domain. Further, the mini slot may be referred to as a sub slot. Each mini slot may include fewer symbols than the slot. A PDSCH (or PUSCH) transmitted in a time unit larger than the mini slot may be referred to as PDSCH (PUSCH) mapping type A. A PDSCH (or PUSCH) transmitted using a mini slot may be referred to as PDSCH (PUSCH) mapping type B.

A radio frame, a subframe, a slot, a mini slot, and a symbol all represent a time unit for transmission of a signal. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as a TTI, a plurality of contiguous subframes may be referred to as a TTI, or one slot or one mini slot may be referred to as a TTI. That is, at least one of the subframe and the TTI may be a subframe (1 ms) in the existing LTE, may be a period shorter than 1 ms (for example, one to thirteen symbols), or may be a period longer than 1 ms. Note that the unit representing the TTI may be referred to as a "slot", a "mini slot", or the like instead of a "subframe".

Here, a TTI refers to the minimum time unit of scheduling in radio communication, for example. For example, in the LTE system, a base station performs scheduling to allocate radio resources (frequency bandwidth, transmission power, and the like that can be used in each user terminal) to each user terminal in TTI units. Note that the definition of a TTI is not limited thereto.

The TTI may be a transmission time unit of channel-encoded data packets (transport blocks), code blocks, codewords, or the like or may be a processing unit of scheduling, link adaptation, or the like. Note that, when a TTI is given, a time interval (for example, the number of symbols) to which transport blocks, code blocks, codewords, or the like are actually mapped may be shorter than the TTI.

Note that, in a case where one slot or one mini slot is referred to as a "TTI", one or more TTIs (that is, one or more slots or one or more mini slots) may be the minimum time unit of scheduling. Also, the number of slots (the number of mini slots) constituting this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that a long TTI (such as a usual TTI and a subframe) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain and may include one or a plurality of contiguous subcarriers in the frequency domain. The number of subcarriers included in the RB may be the same regardless of the numerology, and may be twelve, for example. The number of subcarriers included in an RB may be determined on the basis of the numerology.

Also, an RB may include one or a plurality of symbols in the time domain, and may have a length of one slot, one mini slot, one subframe, or one TTI. One TTI, one subframe, and the like may be each constituted by one or a plurality of resource blocks.

Note that one or a plurality of RBs may be referred to as a physical RB (PRB), a sub-carrier group (SCG), a resource element group (REG), a PRB pair, an RB pair, or the like.

Furthermore, a resource block may be constituted by one or a plurality of resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a given numerology in a given carrier. Here, the common RB may be specified by the index of the RB based on a common reference point of the carrier. A PRB may be defined in a given BWP and be numbered within the BWP.

The BWP may include UL BWP (BWP for UL) and DL BWP (BWP for DL). For a UE, one or a plurality of BWPs may be configured within one carrier.

At least one of the configured BWPs may be active, and the UE may not assume to transmit or receive a given channel/signal outside the active BWP. Note that, a "cell", a "carrier", and the like in the present disclosure may be replaced with a BWP.

Note that the structures of radio frames, subframes, slots, mini slots, symbols, or the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be modified in various manners.

Furthermore, the information, parameters, and the like described in the present disclosure may be represented using absolute values or relative values with respect to given values or may be represented using other corresponding information. For example, a radio resource may be specified by a given index.

The names used for parameters and the like in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not limiting in any respect.

The information, signals, and the like described in the present disclosure may be represented by using any of a variety of different technologies. For example, data, instructions, commands, information, signals, bits, symbols, and chips, all of which may be referenced throughout the above description, may be represented by voltages, currents, electromagnetic waves, magnetic fields or particles, optical fields or photons, or any combination thereof.

Furthermore, information, signals, and the like can be output in at least one of a direction from higher layers to lower layers or a direction from lower layers to higher layers. Information, signals, or the like may be input and output via a plurality of network nodes.

Information, signals, or the like that are input and/or output may be stored in a specific location (for example, in a memory), or may be managed in a control table. The information, signals, and the like to be input and output can be overwritten, updated, or appended. The output information, signals, and the like may be deleted. Information, signals, and the like that are input may be transmitted to other devices.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that physical layer signaling may be referred to as Layer 1/Layer 2 (L1/L2) control information (L1/L2 control signals), L1 control information (L1 control signal), or the like. Further, the RRC signaling may be referred to as an RRC message, and may be, for example, an RRC connection setup message, an RRC connection reconfiguration message, and the like. Furthermore, MAC signaling may be notified using, for example, MAC control elements (MAC control elements (CEs)).

Furthermore, a notification of given information (for example, notification of "being X") is not limited to explicit notification but may be performed implicitly (for example, by not performing notification of the given information or by performing notification of another information).

Judgement may be made in values represented by one bit (0 or 1), may be made in Boolean values that represent true or false, or may be made by comparing numerical values (for example, comparison with a given value).

Software, regardless of whether it is referred to as "software", "firmware", "middleware", "microcode" or "hardware description language", or by other names, should be interpreted broadly, to mean instructions, instruction sets, codes, code segments, program codes, programs, subprograms, software modules, applications, software applications, software packages, routines, subroutines, objects, executable files, execution threads, procedures, functions, or the like.

Moreover, software, commands, information, or the like may be transmitted and received via transmission media. For example, in a case where software is transmitted from a website, a server, or another remote source by using at least one of wired technology (coaxial cable, optical fiber cable, twisted pair, digital subscriber line (DSL), or the like) or wireless technology (infrared rays, microwaves, and the like), at least one of the wired technology and the wireless technology is included within the definition of the transmission media.

The terms "system" and "network" used in the present disclosure can be used interchangeably. A "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. A base station may be referred to by a term such as a macro cell, a small cell, a femto cell, or a pico cell.

A base station can accommodate one or a plurality of (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of the coverage area of at least one of a base station and a base station subsystem that performs a communication service in this coverage.

In the present disclosure, terms such as "mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmitting apparatus, a receiving apparatus, a radio communication apparatus, and the like. Note that at least one of the base station and the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

Furthermore, a base station in the present disclosure may be replaced with a user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, the uplink channel, the downlink channel, and the like may be replaced with a side channel.

Similarly, a user terminal in the present disclosure may be replaced with a base station. In this case, the base station 10 may have the function of the above-described user terminal 20

In the present disclosure, the operation performed by a base station may be performed by an upper node thereof in some cases. In a network including one or a plurality of network nodes with base stations, it is clear that various operations performed for communication with a terminal can be performed by a base station, one or more network nodes (examples of which include but are not limited to mobility management entity (MME) and serving-gateway (S-GW)) other than the base station), or a combination thereof.

Each aspect/embodiment described in the present disclosure may be used alone, used in combination, or used while switched in association with execution. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The phrase "on the basis of" as used in the present disclosure does not mean "on the basis of only" unless otherwise specified. In other words, the phrase "on the basis of" means both "on the basis of only" and "on the basis of at least".

Any reference to an element using designations such as "first" and "second" used in the present disclosure does not generally limit the amount or order of these elements. These designations can be used in the present disclosure, as a convenient way of distinguishing between two or more elements. Thus, the reference to the first and second elements does not mean that only two elements may be adopted or that the first element must precede the second element in a given manner.

The term "deciding (determining)" used in the present disclosure may include a wide variety of operations. For example, "deciding (determining)" may be regarded as "deciding (determining)" on judging, calculating, computing, processing, deriving, investigating, looking up, search, inquiry (for example, looking up in a table, a database, or another data structure), ascertaining, and the like.

Furthermore, "deciding (determining)" may be regarded as "deciding (determining)" on receiving (for example, receiving information), transmitting (for example, transmitting information), input, output, accessing (for example, accessing to data in a memory), and the like.

Furthermore, "deciding (determining)" may be regarded as "deciding (determining)" on resolving, selecting, choosing, establishing, comparing, and the like. In other words, "deciding (determining)" may be regarded as "deciding (determining)" on a given operation.

Furthermore, "determining" may be replaced with "assuming", "expecting", "considering", and the like.

The terms "connected" and "coupled", or any variation thereof used in the present disclosure mean all direct or indirect connections or coupling between two or more elements and can include the presence of one or more intermediate elements between the two elements that are "connected" or "coupled" to each other. The coupling or connection between the elements may be physical, logical, or a combination of these. For example, "connection" may be replaced with "access".

In the present disclosure, when two elements are connected, these elements can be considered to be "connected" or "coupled" to each other by using one or more electrical wires, cables, printed electrical connections, and the like, and by using, as some non-limiting and non-inclusive examples, electromagnetic energy, and the like having a wavelength in the radio frequency domain, the microwave domain, and the optical (both visible and invisible) domain.

In the present disclosure, the phrase "A and B are different" may mean that "A and B are different from each other". Note that the phrase may mean that "A and B are different from C". The terms such as "leave", "coupled", and the like may be interpreted in a similar manner to that of "being different".

In a case where terms such as "include", "including", and variations of these are used in the present disclosure, these terms are intended to be inclusive like the term "comprising" is. Moreover, the term "or" used in the present disclosure is intended not to be exclusive-OR.

In the present disclosure, for example, in a case where translations add articles, such as a, an, and the in English, the present disclosure may include that a noun that follows these articles is in a plural form.

Although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Consequently, the description of the present disclosure is provided only for the purpose of explaining examples, and should by no means be construed to limit the invention according to the present disclosure in any way.

The invention claimed is:

1. A terminal comprising:
  a processor that, when receiving, by radio resource control (RRC) signaling, configuration information regarding a sounding reference signal (SRS) resource set for certain usage, determines, based on the SRS resource set, spatial relation information for a physical uplink shared channel (PUSCH) for multiple transmission/reception points,
    wherein the SRS resource set is indicated by a field of downlink control information (DCI); and
  a transmitter that transmits, based on the spatial relation information, repetition of the PUSCH,
    wherein the processor performs, when a transmission configuration indicator (TCI) state is used as the spatial relation information, to transmit the repetition of the PUSCH using a TCI state set corresponding to a DCI code point and used in common to both downlink and uplink.

2. The terminal according to claim 1, wherein the certain usage is codebook (CB) or noncodebook (NCB).

3. A radio communication method for a terminal, comprising:
  when the terminal receives, by radio resource control (RRC) signaling, configuration information regarding a sounding reference signal (SRS) resource set for certain usage, determining, based on the SRS resource set, spatial relation information for a physical uplink shared channel (PUSCH) for multiple transmission/reception points,
    wherein the SRS resource set is indicated by a field of downlink control information (DCI);

transmitting, based on the spatial relation information, repetition of the PUSCH; and performing, when a transmission configuration indicator (TCI) state is used as the spatial relation information, to transmit the repetition of the PUSCH using a TCI state set corresponding to a DCI code point and used in common to both downlink and uplink.

4. A base station comprising:

a transmitter that, when transmitting, by radio resource control (RRC) signaling, configuration information regarding a sounding reference signal (SRS) resource set for certain usage, transmits, to a terminal, downlink control information (DCI) including a field that indicates the SRS resource set, the DCI being used for determination of spatial relation information for a physical uplink shared channel (PUSCH) for multiple transmission/reception points; and a receiver that receives repetition of the PUSCH transmitted, based on the spatial relation information, from the terminal, wherein the receiver receives, when a transmission configuration indicator (TCI) state is used as the spatial relation information, the repetition of the PUSCH transmitted, using a TCI state set corresponding to a DCI code point and used in common to both downlink and uplink, from the terminal.

5. A system comprising a terminal and a base station, wherein the terminal comprises:

a processor that, when receiving, by radio resource control (RRC) signaling, configuration information regarding a sounding reference signal (SRS) resource set for certain usage, determines, based on the SRS resource set spatial relation information for a physical uplink shared channel (PUSCH) for multiple transmission/reception points, wherein the SRS resource set is indicated by a field of downlink control information (DCI); and a transmitter of the terminal that transmits, based on the spatial relation information, repetition of the PUSCH, wherein the processor performs, when a transmission configuration indicator (TCI) state is used as the spatial relation information, to transmit the repetition of the PUSCH using a TCI state set corresponding to a DCI code point and used in common to both downlink and uplink, and the base station comprises:

a transmitter of the base station that, when transmitting, by the RRC signaling, the configuration information, transmits, to the terminal, the DCI used for determination of the spatial relation information for the PUSCH; and a receiver that receives the repetition of the PUSCH transmitted, based on the spatial relation information, from the terminal, wherein the receiver receives, when the TCI state is used as the spatial relation information, the repetition of the PUSCH transmitted, using the TCI state set, from the terminal.

* * * * *